(12) United States Patent
Zhao

(10) Patent No.: US 10,565,319 B1
(45) Date of Patent: Feb. 18, 2020

(54) TRANSLATION DEVICE WITH TWO-WAY PROJECTION AND VOICE FUNCTIONS

(71) Applicant: Hui Zhao, Guangdong (CN)

(72) Inventor: Hui Zhao, Guangdong (CN)

( * ) Notice: Subject to any disclaimer, the term of this patent is extended or adjusted under 35 U.S.C. 154(b) by 0 days.

(21) Appl. No.: 16/103,954

(22) Filed: Aug. 15, 2018

(51) Int. Cl.
*G06F 17/28* (2006.01)

(52) U.S. Cl.
CPC ................................ *G06F 17/289* (2013.01)

(58) Field of Classification Search
CPC ..... G06F 17/289; G06F 17/28; G06F 17/2854
USPC ...................................................... 704/2, 275
See application file for complete search history.

(56) References Cited

U.S. PATENT DOCUMENTS

| | | | | |
|---|---|---|---|---|
| 7,821,600 B2 * | 10/2010 | Okada | .................. | G03B 21/006 349/117 |
| 10,021,265 B2 * | 7/2018 | Fujiuchi | ............... | H04N 1/0315 |
| 2002/0085343 A1 * | 7/2002 | Wu | ........................ | G06F 1/1616 361/679.55 |
| 2013/0021751 A1 * | 1/2013 | Shiraga | ................. | H01L 23/427 361/697 |
| 2018/0084233 A1 * | 3/2018 | Lara | ..................... | H04N 9/3141 |

* cited by examiner

*Primary Examiner* — Jakieda R Jackson

(57) ABSTRACT

A translation device with two-way projection and voice functions includes: an upper shell, a main shell and a lower shell, wherein the upper shell includes a shell bracket and a cover plate; two projection light machines, a plurality of microphones, an upper control board, a fan and a heat dissipation module are installed in the shell bracket, structural hole positions of projection light machines are formed in two symmetrical sides at the outside of the shell bracket, and the images projected by the two projection light machines can be projected through the structural hole positions of projection light machines; a plurality of microphone speaking holes are further formed at the outside the shell bracket; the fan and the heat dissipation module are further installed in the shell bracket; the cover plate is formed by a combination of a display device and a touch device.

8 Claims, 6 Drawing Sheets

TRANSLATION DEVICE WITH TWO-WAY PROJECTION AND VOICE FUNCTIONS

FIELD OF THE PRESENT INVENTION

The present invention relates to the field of electronic products with display functions, and in particular to a translation device with two-way projection and voice functions, which is capable of realizing projection display and voice playing.

BACKGROUND OF THE PRESENT INVENTION

Translation machines are products that have emerged only in recent years. With the acceleration of the economic globalization, people in all regions of the world are becoming more and more connected, and translation tools become an urgent need for people to learn and communicate. The exchanges between countries and between cultures are becoming more and more frequent, and the information transmission barriers between different languages are increasingly prominent and serious in both work and daily lives. With the development of the electronic technology, the translation machines have developed from the initial dictionary-style word translation to the complete conversion of the whole sentence, thereby terminating the history that mutual communication between people with different languages must be implemented via human interpreters.

However, the traditional translation machines use sound or display screens to perform data exchange, so that during the operation, two operators need to be close to each other and face toward the display devices to communicate with each other, thereby being likely to cause mutual collision and bring some unnecessary troubles.

SUMMARY OF THE PRESENT INVENTION

In view of the drawbacks of the existing translation machines, the technical problem to be solved by the present invention is to provide a device with a two-way projection function, which is convenient to use and portable, and can be mainly used for a novel translation machine with a projection function. The device is provided with a novel projection translation device integrating a two-way projector, a microphone and a loudspeaker and provides a choice of language mode, solves the problem of inconvenient language communication and has the advantages of small volume, low cost, convenience for carrying, wide application range, etc.

In order to solve the above technical problem, the present invention is implemented by the following solutions:

A translation device with two-way projection and voice functions includes: an upper shell, a main shell and a lower shell, wherein the upper shell includes a shell bracket and a cover plate; two projection light machines, a plurality of microphones, an upper control board, a fan and a heat dissipation module are installed in the shell bracket, structural hole positions of projection light machines are formed in two symmetrical sides at the outside of the shell bracket, and the images projected by the two projection light machines can be projected through the structural hole positions of projection light machines; a plurality of microphone speaking holes are further formed at the outside the shell bracket, and the microphones are installed in the microphone speaking holes; the fan and the heat dissipation module are further installed in the shell bracket and function to provide a heat dissipation effect for the projection light machines; the cover plate is formed by a combination of a display device and a touch device; the cover plate is connected with the upper control board, and the touch device controls the upper control board to achieve control of the projection light machines and output of an imaging result; and the upper shell, the main shell and the lower shell are successively combined and connected to form the translation device with the two-way projection and voice functions.

Preferably, the main shell is provided with a space therein, and loudspeakers, a power supply and a power supply heat dissipation bracket are arranged in the space; and a loudspeaker net is further arranged at an outside of the main shell for transmitting the sound of the loudspeaker to the outside.

Preferably, a lower control board is arranged in the lower shell, and a device switch and a charging terminal are arranged on the lower control board; and the device switch is used for turning on or turning off the device, and the charging terminal is used for charging a battery in the device.

Preferably, a plurality of microphone speaking holes are formed at an outside of the upper shell, and the plurality of microphones in the device are installed in the microphone speaking holes, the installation positions and numbers are in one-to-one correspondence with each other, and the microphone speaking holes are located above the structural hole positions of projection light machines and are uniformly distributed on the upper shell.

Preferably, the translation device with two-way projection and voice functions is of a columnar structure.

Preferably, a projection angle of the projection light machine can be adjusted manually or remotely.

Preferably, the translation device with two-way projection and voice functions further includes a translation control system, wherein the display device in the cover plate is started and displays a plurality of function selection indication areas after the two-way translation device is powered on, and the function selection indication areas include a translation indication area and other indication areas; the translation indication area can be clicked to enter the translation control system; and the translation control system includes various kinds of control: control functions of voice mutual translation, caption screen projection, volume control, and one or more language selection areas, and the language selection area provides a plurality of language selection and switching functions.

Preferably, the two-way projection device can implement a separate voice translation function or projection translation function, and can also simultaneously perform both voice and projection translation functions.

DETAILED DESCRIPTION OF THE EMBODIMENTS

In order that the objectives, technical solutions and advantages of the present invention are more comprehensible, the present invention is further described in detail below with reference to the drawings and embodiments. It should be understood that the specific embodiments described herein are merely used for explaining the present invention, rather than limiting the present invention.

Figure 1:
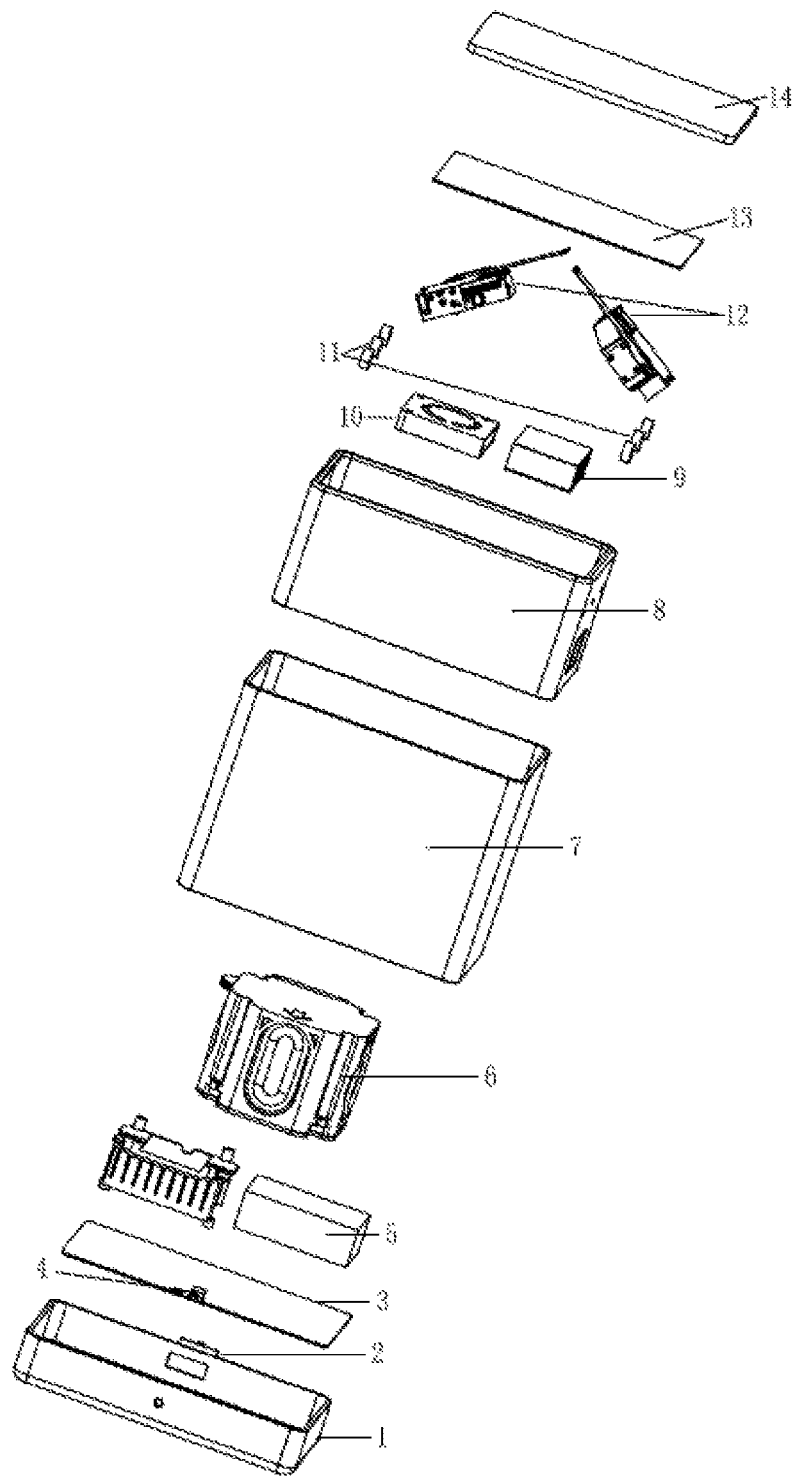
FIG. 1 is a first schematic diagram of the present invention.
Figure 2:
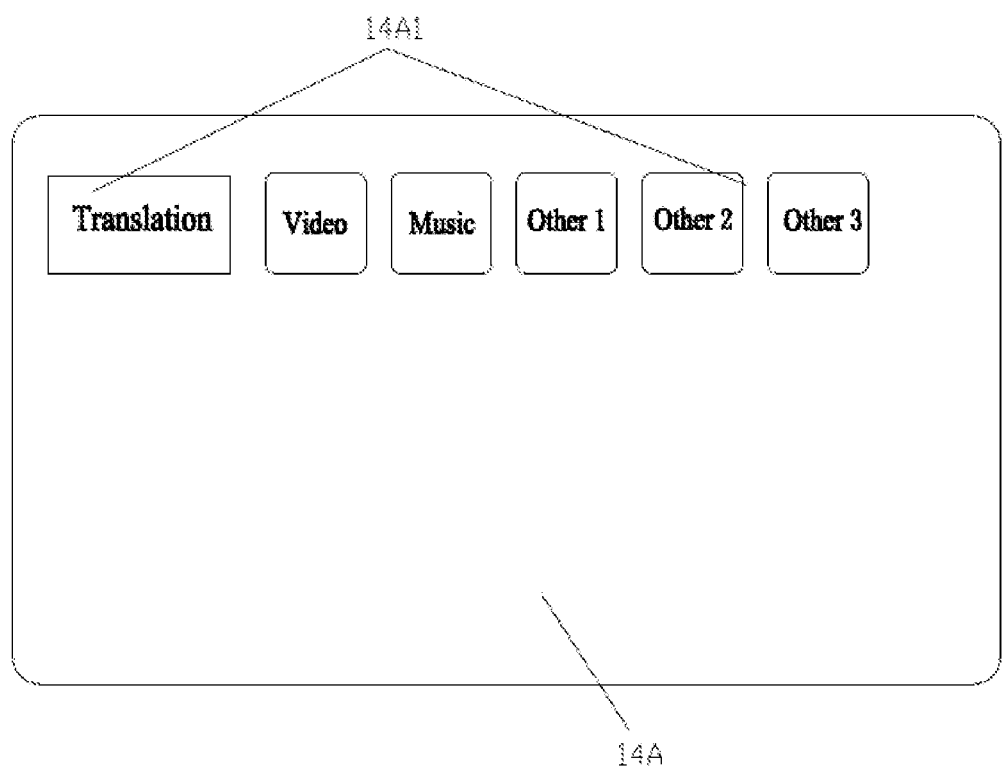
FIG. 2 is a second schematic diagram of the present invention.
Figure 3:
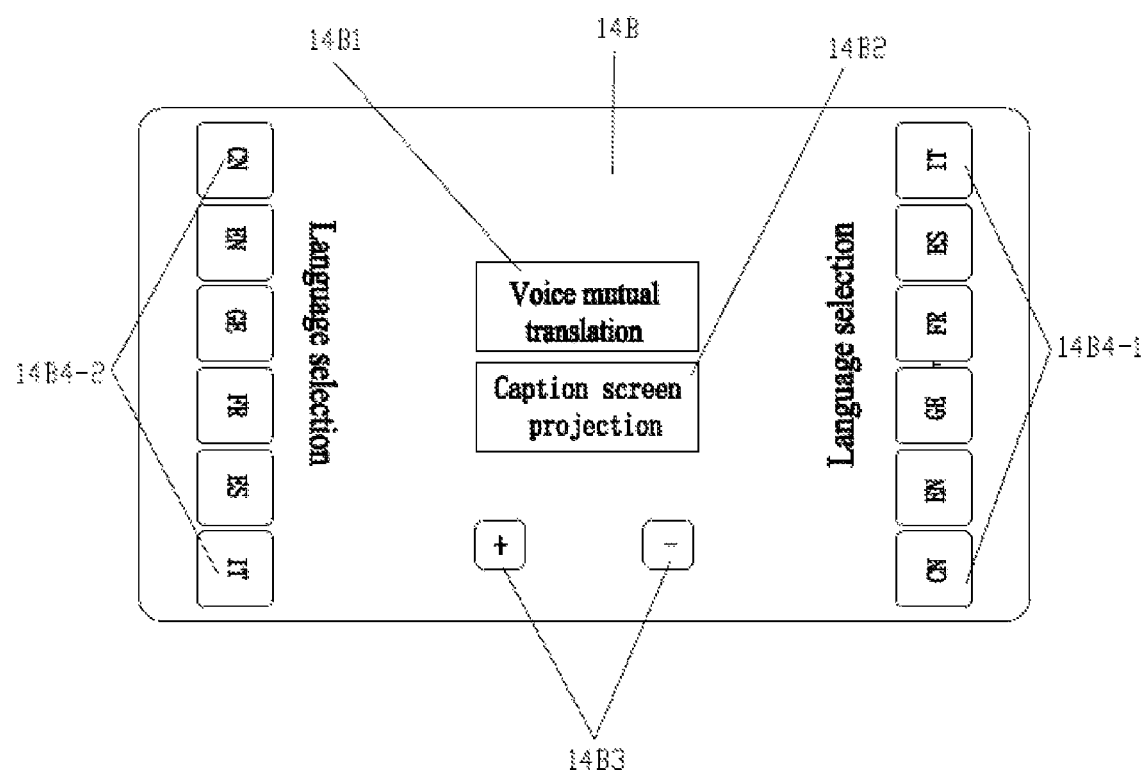
FIG. 3 is a third schematic diagram of the present invention.
Figure 4:
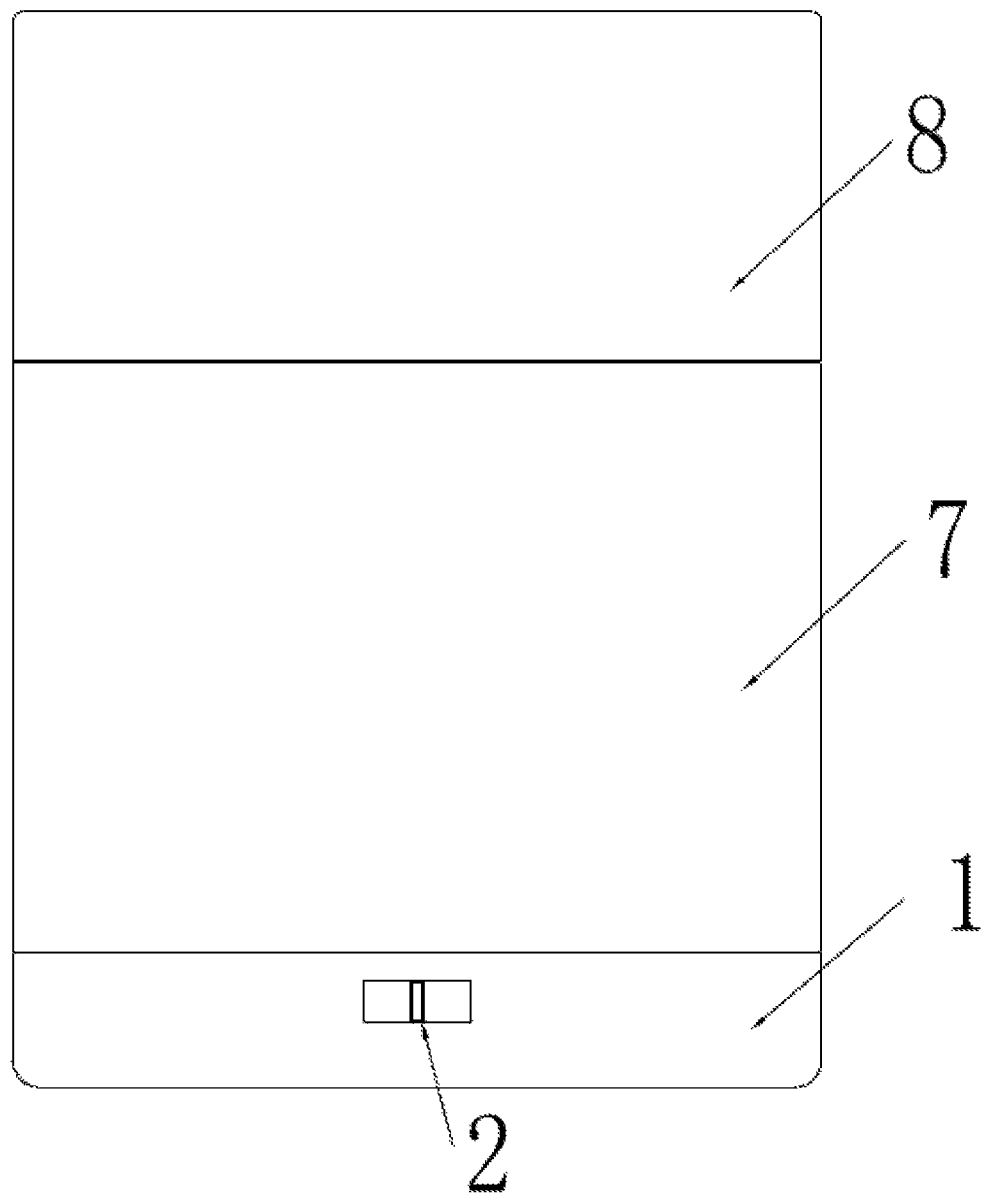
FIG. 4 is a fourth schematic diagram of the present invention.
Figure 5:
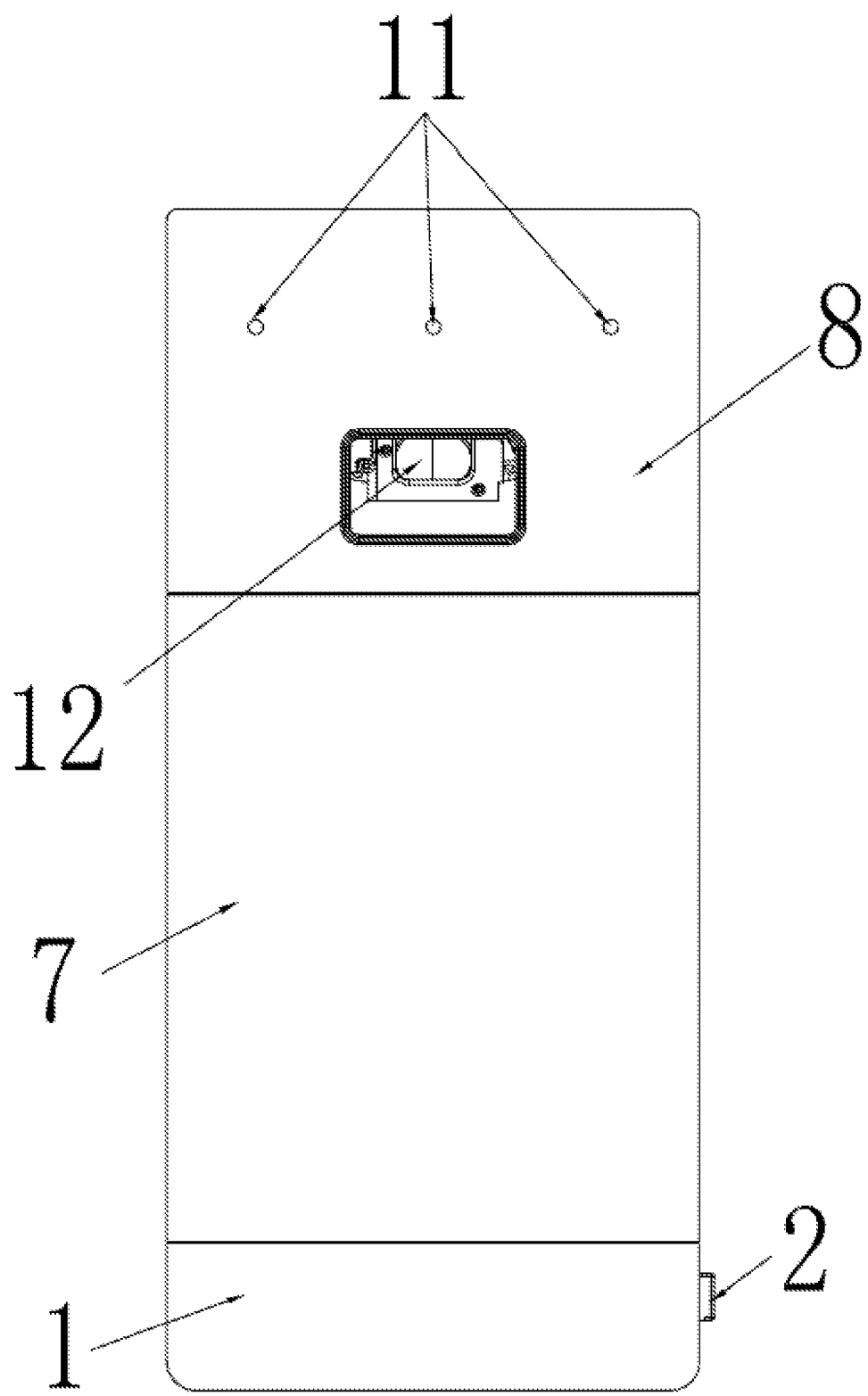
FIG. 5 is a fifth schematic diagram of the present invention.
Figure 6:
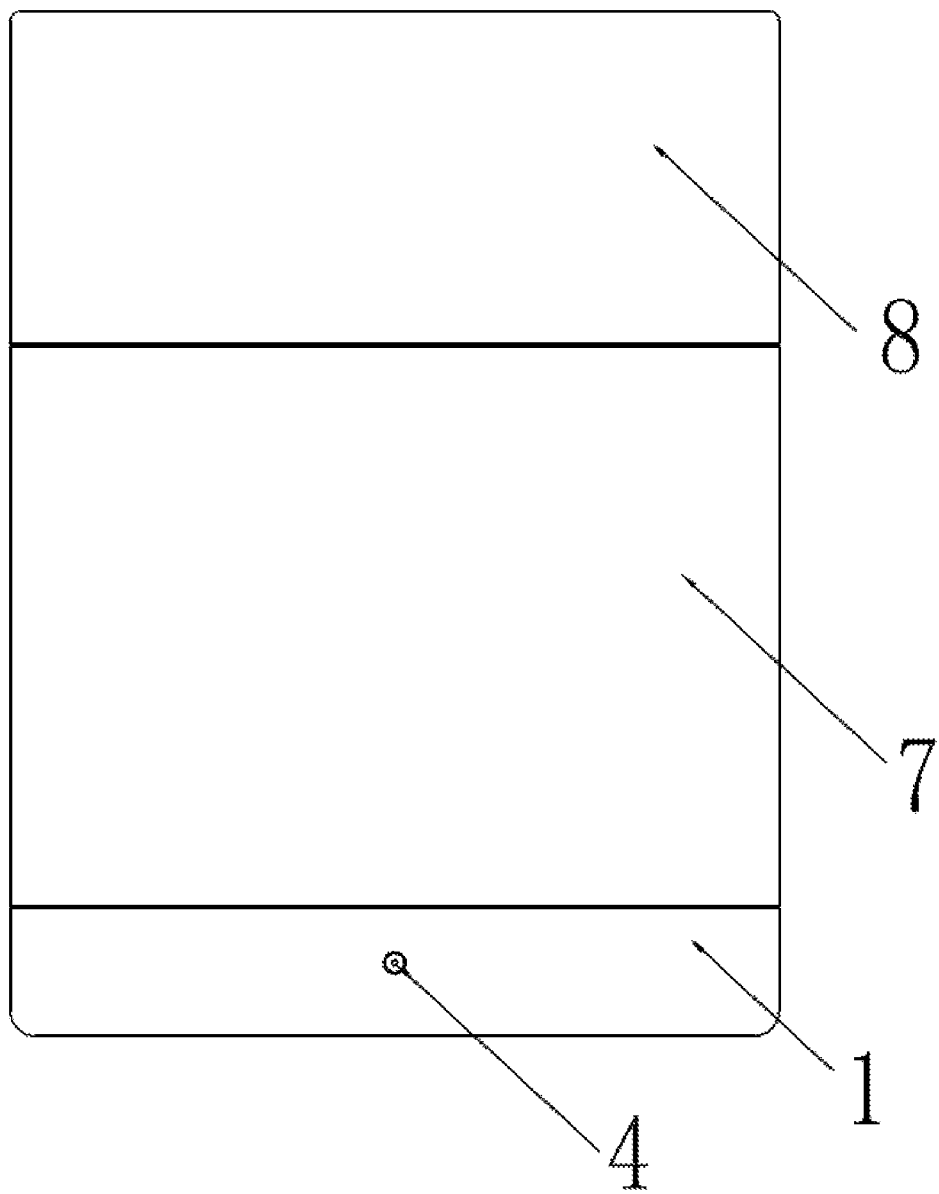
FIG. 6 is a sixth schematic diagram of the present invention.

As shown in FIGS. 1 to 6, a translation device with two-way projection and voice functions includes: an upper shell, a main shell 7 and a lower shell 1, wherein the upper shell includes a shell bracket 8 and a cover plate 14; two projection light machines 12, a plurality of microphones 11, an upper control board 13, a fan 10 and a heat dissipation module 9 are installed in the shell bracket 8, structural hole positions of projection light machines are formed in two symmetrical sides at the outside of the shell bracket, and the images projected by the two projection light machines can be projected through the structural hole positions of projection light machines; a plurality of microphone speaking holes are further formed at the outside the shell bracket 8, and the microphones 11 are installed in the microphone speaking holes; the fan 10 and the heat dissipation module 9 are further installed in the shell bracket and function to provide a heat dissipation effect for the projection light machines 12; the cover plate 14 is formed by a combination of a display device 14A and a touch device 14B; the cover plate 14 is connected with the upper control board 13, and the touch device 14 controls the upper control board 13 to achieve control of the projection light machines 12 and output of an imaging result; and the upper shell, the main shell 7 and the lower shell 1 are successively combined and connected to form the translation device with the two-way projection and voice functions.

Preferably, the main shell 7 is provided with a redundant space therein, and loudspeakers 6, a power supply 5 and a power supply heat dissipation bracket are arranged in the space; and a loudspeaker net is further arranged at the outside of the main shell 7 for transmitting the sound of the loudspeaker to the outside.

Preferably, a lower control board 3 is arranged in the lower shell 1, and a device switch 2 and a charging terminal 4 are arranged on the lower control board; and the device switch is used for turning on or turning off the device, and the charging terminal 4 is used for charging a battery in the device.

Preferably, the plurality of microphone speaking holes are formed at outside the upper shell, and the plurality of microphones 11 in the device are installed in the microphone speaking holes, the installation positions and numbers are in one-to-one correspondence with each other, and the microphone speaking holes are located above the structural hole positions of projection light machines 12 and are uniformly distributed on the upper shell.

Preferably, the translation device with two-way projection and voice functions is of a columnar structure.

Preferably, the projection angle of the projection light machine 12 can be adjusted manually or remotely.

Preferably, the translation device with two-way projection and voice functions further includes a translation control system, wherein the display device 14A in the cover plate 14 is started and displays a plurality of function selection indication areas 14A1 after the two-way translation device is powered on, and the function selection indication areas include a translation indication area and other indication areas; the translation indication area can be clicked to enter the translation control system; and the translation control system includes various kinds of control: control functions of voice mutual translation 14B1, caption screen projection 14B2, volume control 14B3, and one or more language selection areas 14B4, and the language selection area 14B4 provides a plurality of language selection and switching functions.

Preferably, the two-way projection device can implement a separate voice translation function or projection translation function, and can also simultaneously perform both voice and projection translation functions.

Described above are only preferred embodiments of the present invention, which are not intended to limit the creation of the present invention. Any modifications, equivalent substitutions and improvements made within the spirit and principles of the present invention should be included within the protection scope of the present invention.

The invention claimed is:

1. A translation device with two-way projection and voice functions, comprising: an upper shell, a main shell and a lower shell; wherein the upper shell comprises a shell bracket and a cover plate; two projection light machines, a plurality of microphones, an upper control board, a fan and a heat dissipation module are installed in the shell bracket, structural hole positions of projection light machines are formed in two symmetrical sides at the outside of the shell bracket, and images projected by the two projection light machines can be projected through the structural hole positions of projection light machines; a plurality of microphone speaking holes are further formed at the outside the shell bracket, and the microphones are installed in the microphone speaking holes; the fan and the heat dissipation module are further installed in the shell bracket and function to provide a heat dissipation effect for the projection light machines; the cover plate is formed by a combination of a display device and a touch device; the cover plate is connected with the upper control board, and the touch device controls the upper control board to achieve control of the projection light machines and output of an imaging result; and the upper shell, the main shell and the lower shell are successively combined and connected to form the translation device with the two-way projection and voice functions.

2. The translation device with two-way projection and voice functions according to claim 1, wherein the main shell is provided with a space therein, and loudspeakers, a power supply and a power supply heat dissipation bracket are arranged in the space; and a loudspeaker net is further arranged at an outside of the main shell for transmitting the sound of the loudspeaker to the outside.

3. The translation device with two-way projection and voice functions according to claim 1, wherein a lower control board is arranged in the lower shell, and a device switch and a charging terminal are arranged on the lower control board; and the device switch is used for turning on or turning off the device, and the charging terminal is used for charging a battery in the device.

4. The translation device with two-way projection and voice functions according to claim 1, wherein a plurality of microphone speaking holes are formed at an outside of the upper shell, and the plurality of microphones in the device are installed in the microphone speaking holes, installation positions and numbers are in one-to-one correspondence with each other, and the microphone speaking holes are located above the structural hole positions of projection light machines and are uniformly distributed on the upper shell.

5. The translation device with two-way projection and voice functions according to claim 1, wherein the translation device with two-way projection and voice functions is of a columnar structure.

6. The translation device with two-way projection and voice functions according to claim 1, wherein a projection angle of the projection light machine is adjusted manually or remotely.

7. The translation device with two-way projection and voice functions according to claim 1, further comprising a translation control system, wherein the display device in the cover plate is started and displays a plurality of function selection indication areas after the two-way translation device is powered on, and the function selection indication areas include a translation indication area and other indication areas; the translation indication area can be clicked to enter the translation control system; and the translation control system includes various kinds of control: control functions of voice mutual translation, caption screen projection, volume control, and one or more language selection areas, and the language selection area provides a plurality of language selection and switching functions.

8. The translation device with two-way projection and voice functions according to claim 1, wherein the two-way projection device implement a separate voice translation function or projection translation function, and also simultaneously perform both voice and projection translation functions.

* * * * *